United States Patent [19]

Bachman et al.

[11] Patent Number: 4,499,535
[45] Date of Patent: Feb. 12, 1985

[54] DIGITAL COMPUTER SYSTEM HAVING DESCRIPTORS FOR VARIABLE LENGTH ADDRESSING FOR A PLURALITY OF INSTRUCTION DIALECTS

[75] Inventors: Brett L. Bachman, Boston, Mass.; Richard A. Belgard, Saratoga, Calif.; David H. Bernstein, Ashland; Richard G. Bratt, Wayland, both of Mass.; Gerald F. Clancy, Saratoga, Calif.; Edward S. Gavrin, Lincoln, Mass.; Ronald H. Gruner, Cary, N.C.; Thomas M. Jones, Chapel Hill, N.C.; Craig J. Mundie; James T. Nealon, both of Cary, N.C.; John F. Pilat, Raleigh, N.C.; Stephen I. Schleimer, Chapel Hill, N.C.; Steven J. Wallach, Saratoga, Calif.

[73] Assignee: Data General Corporation, Westboro, Mass.

[21] Appl. No.: 266,427

[22] Filed: May 22, 1981

[51] Int. Cl.³ ............................ G06F 9/34; G06F 7/04
[52] U.S. Cl. ..................................................... 364/200
[58] Field of Search ... 364/200 MS File, 900 MS File; 340/347 DD

[56] References Cited

U.S. PATENT DOCUMENTS

| | | | |
|---|---|---|---|
| 3,388,381 | 6/1968 | Prywes et al. | 364/200 |
| 3,739,352 | 6/1973 | Packard | 364/200 |
| 3,766,532 | 10/1973 | Liebel | 364/200 |
| 3,821,711 | 6/1974 | Elam et al. | 340/347 DD |
| 3,840,862 | 10/1974 | Ready | 364/200 |
| 4,050,058 | 9/1977 | Garlic | 364/200 |
| 4,077,059 | 2/1978 | Cordi et al. | 364/200 |
| 4,084,226 | 4/1978 | Anderson et al. | 364/200 |
| 4,136,386 | 1/1979 | Annunziata et al. | 364/200 |
| 4,179,738 | 12/1979 | Fairchild et al. | 364/200 |
| 4,206,503 | 6/1980 | Woods et al. | 364/200 |
| 4,210,960 | 7/1980 | Borgerson | 364/200 |
| 4,241,397 | 12/1980 | Strecker et al. | 364/200 |
| 4,241,399 | 12/1980 | Strecker et al. | 364/200 |

OTHER PUBLICATIONS

Bit Sliced Microprocessor Architecture—Alexandrides; IEEE Computer—Jun. 1978, pp. 56-81—L7904 0001.

Primary Examiner—Harvey E. Springborn
Attorney, Agent, or Firm—Joel Wall; Gene Nelson; Leonard Suchyta

[57] ABSTRACT

A digital computer uses a memory which is structured into objects, which are blocks of storage of arbitrary length, in which data items are accessed by descriptors which for a desired data item specify the object, the offset into that object, and the length of the data object. The computer system of the present invention further provides the ability to execute any of a plurality of dialects of internal instructions, the repertoire of such dialects being virtually infinite, since there is the ability to load a supporting microcode during operation as needed.

10 Claims, 1 Drawing Figure

DIGITAL COMPUTER SYSTEM HAVING DESCRIPTORS FOR VARIABLE LENGTH ADDRESSING FOR A PLURALITY OF INSTRUCTION DIALECTS

CROSS REFERENCE TO RELATED APPLICATIONS

The present patent application is related to other patent applications assigned to the assignee of the present application.

BACKGROUND OF THE INVENTION

1. Field of the Invention

The present invention relates to a digital data processing system and, more particularly, to a multiprocess digital data processing system suitable for use in a data processing network and having a simplified, flexible user interface and flexible, multileveled internal mechanisms.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appeared repeatedly in the prior art and must be overcome to create a data processing system having the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior processor systems have operated as fixed word length machines, further limiting user operations.

Prior data processing systems have not provided effective protection mechanisms preventing one user from effecting another user's data and programs without permission. Such protection mechanisms have not allowed unique, positive identification of users requesting access to information, or of information, nor have such mechanisms been sufficiently flexible in operation. In addition, access rights have pertained to the users rather than to the information, so that control of access rights has been difficult. Finally, prior art protection mechanisms have allowed the use of "Trojan Horse arguments". That is, users not having access rights to certain information have been able to gain access to that information through another user or procedure having such access rights.

Yet another problem of the prior art is that of providing a simple and flexible interface user interface to a data processing system. The character of user's interface to a data processing system is determined, in part, by the means by which a user refers to and identifies operands and procedures of the user's programs and by the instruction structure of the system. Operands and procedures are customarily referred to and identified by some form of logical address having points of reference, and validity, only within a user's program. These addresses must be translated into logical and physical addresses within a data processing system each time a program is executed, and must then be frequently retranslated or generated during execution of a program. In addition, a user must provide specific instructions as to data format and handling. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A data processing system's instruction structure includes both the instructions for controlling system operations and the means by which these instructions are executed. Conventional data processing systems are designed to efficiently execute instructions in one or two user languages, for example, FORTRAN or COBOL. Programs written in any other language are not efficiently executable. In addition, a user is often faced with difficult programming problems when using any high level language other than the particular one or two languages that a particular conventional system is designed to utilize.

Yet another problem in conventional data processing systems is that of protecting the system's internal mechanisms, for example, stack mechanisms and internal control mechanisms, from accidental or malicious interference by a user.

Finally, the internal structure and operation of prior art data processing systems have not been flexible, or adaptive, in structure and operation. That is, the internal structure structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modifications have significantly effected the users interface with the system. Ideally, the actual physical structure and operation of the data processing system should not be apparent at the user interface.

The present invention provides data processing system improvements and features which solve the above-described problems and limitations.

SUMMARY OF THE INVENTION

The present invention relates generally to digital computer systems and more specifically to digital computer systems employing object-based addressing of data. The digital computer system of the present invention includes a memory system including mass storage devices and one or more processors connected to the memory system.

The memory system is organized into objects containing data items. Each data item is identified by a descriptor, which consists of three fields: the first specifies the object in which the data item is to be found; the second specifies how far into that object the data item begins; the third indicates the length of the data item.

The processor does not possess a fixed machine language as do processors of the prior art but can execute any of a plurality of S-languages. S-languages are of higher order than typical machine languages, and can be tailored to the characteristics and processing requirements of user HOL's (high-order languages). The instructions in a procedure are S-language instructions; the procedure also includes a dialect code which indicates the dialect to which the instructions of the present procedure belong. For purposes of executing the instructions, dispatching to appropriate microcode is controlled not only by the instruction bit pattern, but the current dialect code as well.

Execution of the S-language instructions is effected by the use of microcode control; since the microcode is kept in a writable control store, there is the ability to load microcode as needed while running. Thus, there is no limit to the number of dialects that may be interpreted.

The speed of executing internal instructions is enhanced by prefetch means which allow fetching the next instruction while the current instruction is still executing.

It is thus an object of the present invention to provide an improved data processing system.

It is yet another object of the present invention to provide an improved addressing mechanism suitable for use in large, interconnected data processing networks.

It is yet a further object of the present invention to provide an improved mechanism for referring to operands.

It is a still further object of the present invention to provide an instruction structure allowing efficient data processing system operation with a plurality of high level user languages.

It is a further object of the present invention to provide data processing internal mechanisms protected from user interference.

It is yet another object of the present invention to provide a data processing system having a flexible internal structure capable of multiple, concurrent operations.

Other objects, advantages and features of the present invention will be understood by those of ordinary skill in the art, after referring to the following detailed description of the preferred embodiments and drawings wherein:

Figure 1:
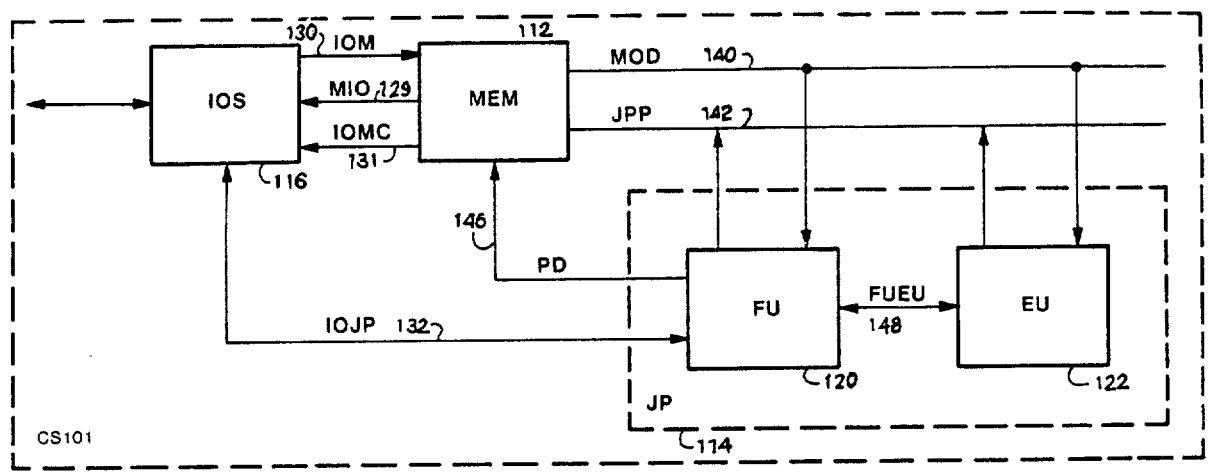
FIG. 1 is a partial block diagram of a computer system incorporating the present invention.

The FIGURE numbers in this application have two components, one indicating the chapter in which the figure is located and the other the sequential number of the figure within that chapter. Thus, FIGS. 1 through 20 refer to the Introduction, 101 to 110 to Chapter 1, and so forth. There are no FIGS. 21-100, 111-200, 275-300, or 308-400 in the application.

This application incorporates by reference the entire application, Ser. No. 266,402, filed on May 22, 1981, of Ward Baxter II et al.

More particularly, attention is directed to FIGS. 7, 102, 110, 202, 202A, 242, and 249 of the drawings in application Ser. No. 266,402, and to that part of the specification, particularly at pages 371-704 thereof, which relate to subject matter of the claims herein.

What is claimed is:

1. A digital computer system (CS 101) including
   processor means (JP 114) for performing operations on operands;
   memory means (112) for storing the operands and instructions for directing the operations;
   bus means (MOD 140, JPD 142) for conducting the instructions and the operands between the memory means and the processor means, and;
   I/O means (IOS 116) for conducting the operands in either direction between the digital computer system and devices external thereto;
   the processor means including:
      addressing means (DESCRIPTOR PROCESSOR 715) connected to the bus means for providing to the memory means addresses used for controlling transfer of said operands and instructions between the memory means and the processor means, the addressing means including means for receiving and translating descriptors, each said descriptor comprising:
         an object field for identifying a certain object, an object being a block of contiguous storage of variable length,
         an offset field for specifying how many bits into the said object a certain operand or instruction begins, and
         a length field for specifying the number of contiguous bits comprising said certain operand or instruction, and;
      microcode control means (10236) responsive to the instructions, the microcode control means including:
         microcode storage means (uCCS 10238, FIGS. 102 & 110) for storing sequences of microinstructions for controlling the processor means, having at least one sequence of microinstructions corresponding to each instruction from each dialect of a plurality of dialects, and
         microcode fetch means (uPC 20276) responsive to instructions in conjunction with a dialect code to retrieve from the microcode storage means the corresponding sequence of microinstructions and to provide said sequence of microinstructions to the processor means.

2. The digital computer system of claim 1, wherein said microcode control means further comprises:
   dispatch table means (SDT 11010, SITT 11012) for storing addresses corresponding to locations in said microcode storage means of each of the said sequences of microinstructions,
      the dispatch table means responsive to the present instruction in conjunction with the present dialect code in the dialect register (RDIAL 24212) to provide to the microcode storage means the address of the microinstructions to be executed.

3. The digital computer system of claims 1 or 2, wherein the said microcode control means further comprises a receiving means including:

instruction register means (INSTB 20262) connected to the bus means for storing the current one of the instructions, and parsing means (20264) responsive to said instruction register means for providing said current instructions to the microcode fetch means.

4. The digital computer system of claim 3, wherein said receiving means further comprises:

prefetch means (PREF 202_) connected to the bus means and responsive to said parsing means for providing read request signals to the memory means for retrieving the instruction which is to be executed after the present instruction.

5. The digital computer system of claims 1 or 2, wherein said microcode control means further comprises:

means (24914) connected to said bus means for receiving said sequences of microinstructions from said memory means and storing them in said microcode storage means, said dispatch table means further comprising write address means (CSADR 20204) responsive to said processor means for generating addresses within the microcode storage means of the locations to which the sequences of microinstructions are to be written.

6. A digital computer system (CS 101) including processor means (JP 114) for performing operations on operands;

memory means (112) for storing the operands and instructions for directing the operations;

bus means (MOD 140, JPD 142) for conducting the instructions and the operands between the memory means and the processor means, and;

I/O means (IOS 116) for conducting the operands in either direction between the digital computer system and devices external thereto;

the processor means including:

addressing means (DESCRIPTOR PROCESSOR 715) connected to the bus means for providing to the memory means addresses used for controlling transfer of said operands and instructions between the memory means and the processor means, the addressing means including means for receiving and translating descriptors, each said descriptor comprising:

an object field for identifying a certain object, an object being a block of contiguous storage of variable length, an offset field for specifying how many bits into the said object a certain operand or instruction begins, and a length field for specifying the number of contiguous bits comprising said certain operand or instruction, the addressing means further including string transfer means for providing to the memory means strings of consecutive addresses for controlling transfer of operands between the memory means and the processor means, the number of information bits of said operands being greater than the width of said bus means, each said consecutive address denoting a segment of said memory means containing a number of bits equal to or less than the width of said bus means, and, microcode control means (10236) responsive to the instructions, the microccode control means including:

microcode storage means (uCCS 10238, FIGS. 102 & 110) for storing sequences of microinstructions for controlling the processor means, having at least one sequence of microinstructions corresponding to each instruction from each dialect of a plurality of dialects, and microcode fetch means (uPC 20276) responsive to instructions in conjunction with a dialect code to retrieve from the microcode storage means the corresponding sequence of microinstructions and to provide said sequence of microinstructions to the processor means.

7. The digital computer system of claim 6, wherein said microcode control means further comprises:

dispatch table means (SDT 11010, SITT 11012) for storing addresses corresponding to locations in said microcode storage means of each of the said sequences of microinstructions, the dispatch table means responsive to the present instruction in conjunction with the present dialect code in the dialect register (RDIAL 24212) to provide to the microcode storage means the address of the microinstructions to be executed.

8. The digital computer system of claims 6 or 7, wherein the said microcode control means further comprises a receiving means including:

instruction register means (INSTB 20262) connected to the bus means for storing the current one of the instructions, and parsing means (20264) responsive to said instruction register means for providing said current instructions to the microcode fetch means.

9. The digital computer system of claim 8, wherein said receiving means further comprises:

prefetch means (PREF 202_) connected to the bus means and responsive to said parsing means for providing read request signals to the memory means for retrieving the instruction which is to be executed after the present instruction.

10. The digital computer system of claims 6 or 7, wherein said microcode control means further comprises:

means (24914) connected to said bus means for receiving said sequences of microinstructions from said memory means and storing them in said microcode storage means, said dispatch table means further comprising write address means (CSADR 20204) responsive to said processor means for generating addresses within the microcode storage means of the locations to which the sequences of microinstructions are to be written.

* * * * *